Oct. 5, 1937.   H. L. ADAMS   2,095,020
TELESCOPING BODY
Filed Nov. 22, 1932   2 Sheets-Sheet 1
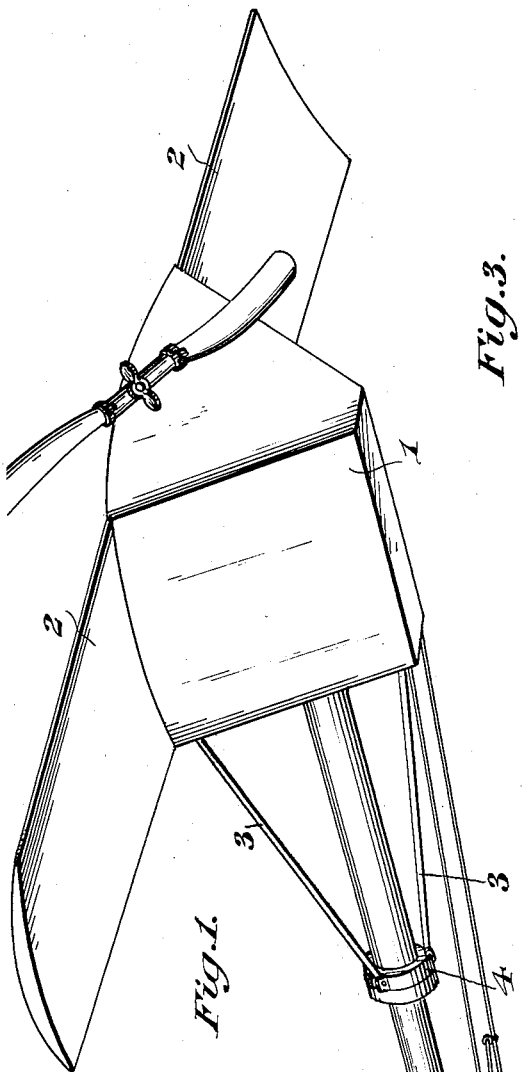
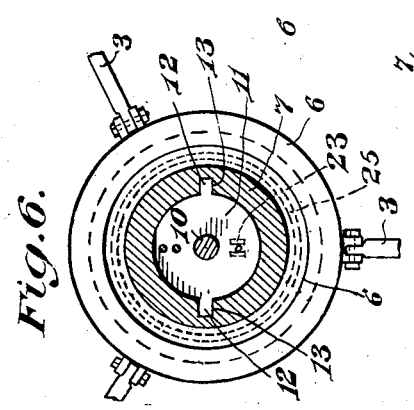
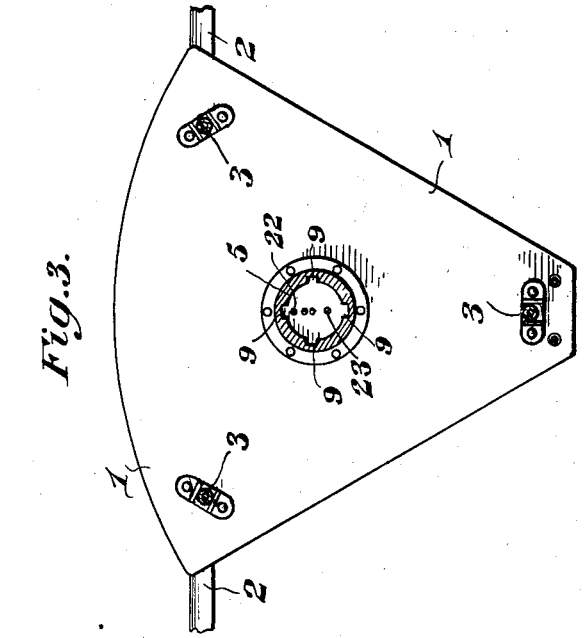
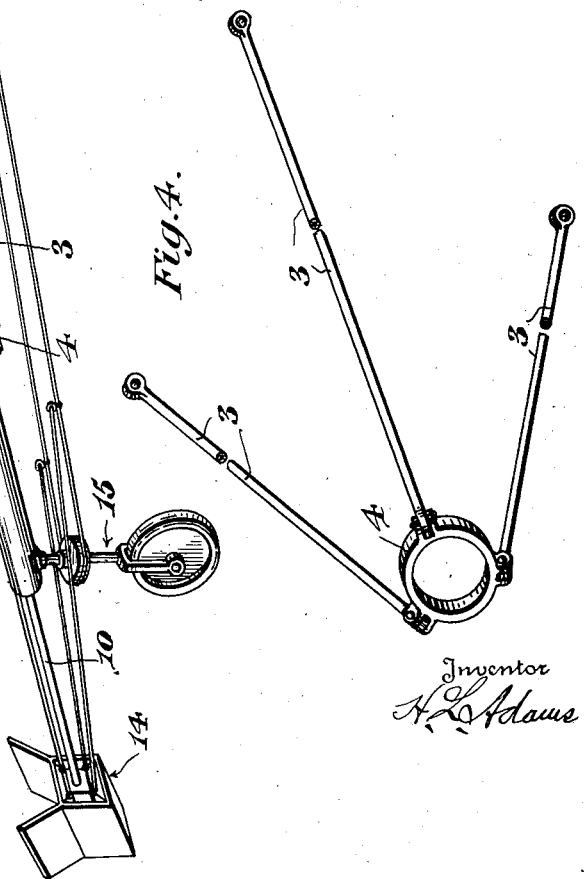
Inventor
H. L. Adams Oct. 5, 1937.   H. L. ADAMS   2,095,020
TELESCOPING BODY
Filed Nov. 22, 1932   2 Sheets-Sheet 2

Inventor
H. L. Adams

Patented Oct. 5, 1937

2,095,020

UNITED STATES PATENT OFFICE 2,095,020

TELESCOPING BODY

Herbert Luther Adams, Washington, D. C.

Application November 22, 1932, Serial No. 644,555

12 Claims. (Cl. 244—87)

This invention relates to a flying machine, and the application is a continuation in part of my prior application Serial Number 461,412, filed April 14, 1921, and now matured into Patent No. 1,888,418.

The primary object of the invention is to provide a flying machine which may be extended for flight, and retracted to facilitate storage or transportation thereof.

A further object of the invention is to provide a flying machine which may be extended or retracted in a desired degree during flight in order that the same may be adjusted at will for proper safety when landing or taking off, and to present a minimum of resistance during full flight.

A further object of the invention is to provide a flying machine of the character aforesaid in which certain of the parts are arranged in telescoping relation to certain other parts thereof.

A still further object is to provide a fuselage that quite a part of its rigidity is due to internal pressure.

In the accompanying drawings,

Figure 1 is a perspective view of a flying machine in accordance with this invention.

Figure 3 is a section taken on the line 3—3 of Figure 2.

Figure 4 is a perspective detail of the tripod bracing for the telescoping parts.

Figure 6 is an enlarged section taken on the line 6—6 of Figure 2.

Figure 2:
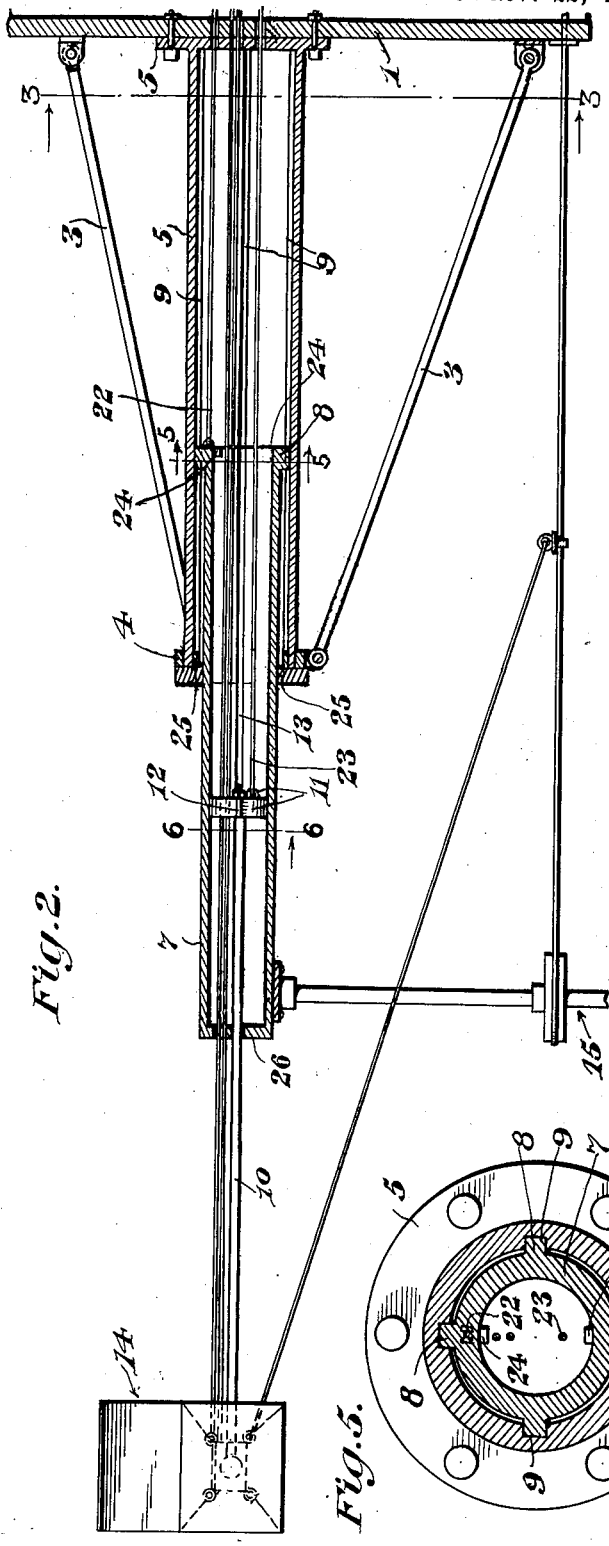
Figure 2 is an enlarged longitudinal section through the telescoping parts at the rear of the flying machine body.
Figure 5:
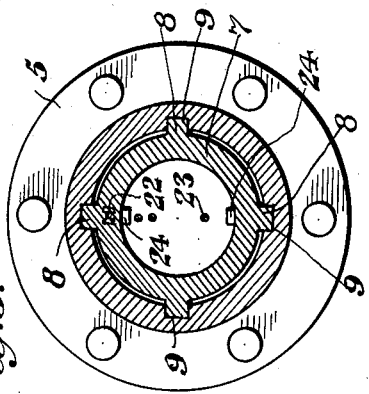
Figure 5 is an enlarged section taken on the line 5—5 of Figure 2.

Referring to the drawings in detail, the numeral 1 indicates a flying machine body which has a length substantially equal to the chord of the wings 2. That is, the fore and aft dimensions of the body and wings are substantially equal. The body is in no way limited to the cord of the wing. Projecting rearwardly from the body 1 are a plurality of bracing members 3, preferably three in number and converging rearwardly in the form of a tripod. The members 3 are securely fastened at their forward ends to the framing of or are extensions of the framing of body 1, and at their rearward ends to a collar 4 which supports an elongated hollow member 5 at the rearward end of the latter. The member 5 preferably is cylindrical in form, and the forward end thereof is securely anchored in any suitable manner to the body 1. The collar 4 may be formed integrally with the member 5 in the form of a flange, or may be a separate piece as shown in Figure 4. The tripod bracing is not an essential part of the device but a preferred form and shall preferably be tubing but any form of bracing may be used.

Slidingly extending through the rearward end of the member 5 is a similar though smaller member 7 provided at its forward end with lateral projections 8 which fit within grooves 9 extending lengthwise of the member 5. The projections 8 and grooves 9 prevent any relative rotary movement between the members 7 and 5. Slidingly extending through the rearward end of the member 7 is a rod 10 provided at its forward end with a head or piston 11 having projections 12 fitting within grooves 13 extending lengthwise of the member 7. Any suitable number of projections 8 and 12 may be provided, with the number of grooves 9 and 13 corresponding to the number of projections 8 and 12 respectively. The rod 10 is adapted to support at its rearward end a rudder indicated generally at 14, and the member 7 is adapted to have suspended from its rearward end a rear support such as the ground engaging wheel mechanism indicated generally at 15.

The hollow member 7 may be drawn into telescoping relation with respect to the hollow member 5 by means of a control line 22 secured to the forward end of the member 7, and projecting through the hollow member 5 and into the body 1 to be within the ready reach of the operator. By manipulation of the control line 22, the hollow member 7 may be retracted and maintained in any position desired with respect to the hollow member 5. A similar control line 23 is secured to the piston 11. By manipulation of the control line 23 and release line 21, the rod 10 may be retracted and maintained in any position desired with respect to the hollow member 7. Thus it will be seen that by the selective manipulation of control lines 22 and 23, and release lines 18 and 21, the rod 10 and hollow member 7 may be retracted independently and selectively. The rod 10 and hollow member 7 both may be retracted within the hollow member 5 by means of the control line 23. Suitable stops, such as 24 and 25 are provided respectively at the forward end of the member 7 and at the rearward end of the member 5. Preferably the member 7 will be formed at its rearward end with an inturned flange 26 to provide a stop. While the drawings show a particular form for the construction of the forward part of the aircraft, this construction is not a vital part of the invention and any structure may be used without departing from the essential features of the multiple telescoping rear end for supporting the rudder.

All rods referred to may be and preferably shall be tubing, if desired without departing from the spirit of the invention. All tubes may have air pressure in them to give added rigidity.

Figure 7:
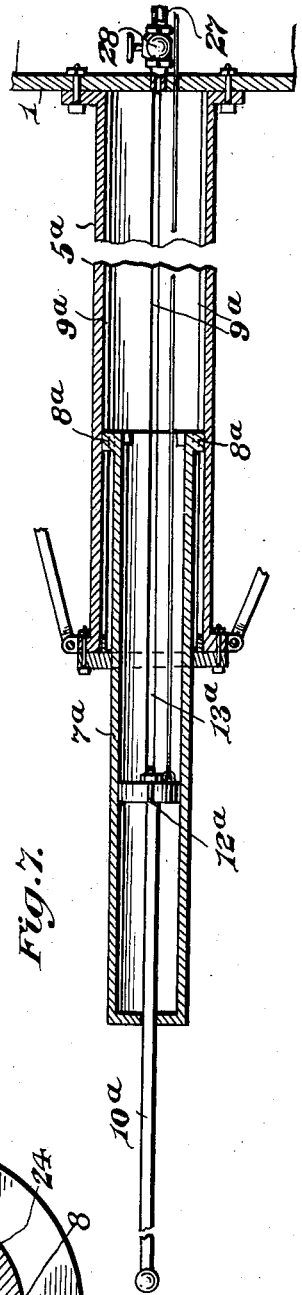
Figure 7 is a view similar to Figure 2 illustrating a modified form of control for the telescoping parts.

In the modification shown in Figure 7, a fluid line 27 having a valve 28 is connected with the hollow member 5a adjacent the inner end of the latter. With this construction, compressed fluid may be forced into the member 5a to extend hollow member 7a and rod 10a, or suction may be created within the line 27 to retract hollow member 7a and rod 10a. If desired, control lines such as 22 and 23 heretofore described could be employed to resist the pressure from fluid line 27 in order to selectively extend or retract the hollow member 7a and rod 10a. In this form of structure, all parts such as the projections 8a and 12a, and grooves 9a and 13a, are provided which correspond to the similar parts heretofore described in connection with the form of invention shown in Figure 2. Any suitable means may be employed for creating pressure or suction within the fluid line 27.

Any type landing gear may obviously be used on body 1. The position of wings relative to body and the shape of the body are not essential parts of this invention.

Having described my invention, what I claim as new, and desire to secure by Letters Patent, is:—

1. A flying machine having a body and laterally extending wings, said body having a length substantially equal to the chord of the wings, a tubular member projecting centrally and rearwardly of said body, a tripod member having diverging legs, the diverging ends of said legs being secured to said body and the other ends being secured to the rear end of said tubular member to brace the same, a member telescoping within said tubular member and carrying steering mechanism and a ground engaging wheel, and means for retracting and extending said last mentioned member.

2. A flying machine having a body and laterally extending wings, said body having a length substantially equal to the chord of the wings, a tubular member projecting centrally and rearwardly of said body, a tripod member having diverging legs, the diverging ends of said legs being secured to said body and the other ends being secured to the rear end of said tubular member to brace the same, a member telescoping within said tubular member and carrying steering mechanism and a ground engaging wheel, means for retracting and extending said last mentioned member, and means for latching the telescoping members with respect to each other.

3. A flying machine having a body and laterally extending wings, said body having a length substantially equal to the chord of the wings, a tubular member projecting centrally and rearwardly of said body, a tripod member having diverging legs, the diverging ends of said legs being secured to said body and the other ends being secured to the rear end of said tubular member to brace the same, a ground engaging wheel carrying member telescoping within said tubular member, a steering mechanism carrying member telescoping within said ground engaging wheel carrying member, and means for independently retracting and extending said last mentioned members.

4. A flying machine having a body and laterally extending wings, said body having a length substantially equal to the chord of the wings, a tubular member projecting centrally and rearwardly of said body, a tripod member having diverging legs, the diverging ends of said legs being secured to said body and the other end being secured to the rear end of said tubular member to brace the same, a member telescoping within said tubular member and carrying the tail and rear support for the machine, and means for retracting and extending said last mentioned member.

5. A flying machine having a body and laterally extending wings, said body having a length substantially equal to the chord of the wings, a tubular member projecting rearwardly of said body, bracing members having their forward ends secured to said body and the other ends secured to the rear of said tubular member to brace the same, telescoping means within said tubular member and carrying steering mechanism and a ground engaging wheel, and means for retracting and extending said telescoping means.

6. A flying machine having a body and laterally extended wings, a tubular member projecting rearwardly of said wings, bracing members having their forward ends secured to said body and the other ends secured to the rear end of said tubular member to brace the same, a rear support carrying member telescoping within said tubular member; a steering mechanism carrying member telescoping within said rear support carrying member, and means for independently retracting and extending said telescoping members.

7. A flying machine having a body and laterally extending wings, a tubular member projecting rearwardly of said wings, bracing members having their forward ends secured to said body, and the other ends secured to the rear end of said tubular member to brace the same, telescoping means within said tubular member and carrying steering mechanism and a ground engaging wheel, and hydraulic means for retracting and extending said telescoping means.

8. A flying machine having a body and laterally extending wings, said body having its rearward end substantially in alinement with the rear edges of the wings, a tubular member projecting rearwardly of said body, rearwardly converging braces having their forward ends secured to said body, and the other ends secured to the rear end of said tubular member to brace the same, and a telescoping device within said tubular member, said device carrying steering mechanism and a landing gear.

9. In a flying machine, a body, a telescoping extension projecting rearwardly from the body and including a stationary part and a movable part, tripod forming bracing members having their diverging ends secured to the body and further having their converging ends secured to the rear portion of the stationary part to brace the same, said movable part telescoping within the stationary part and carrying a steering mechanism and a rear support, and means for retracting and extending said movable part.

10. A flying machine having a body and laterally extending wings, a tubular member projecting rearwardly of said wings, tripod forming bracing members having their diverging ends secured to said body and further having their converging ends secured to the rear end of said tubular member to brace the latter, a steering mechanism carrying means telescoping within said tubular member, and means for extending and retracting said steering mechanism carrying means.

11. A flying machine having a body and laterally extending wings, concentric telescoping tubular members projecting rearwardly of said body, a tripod member having diverging legs, the diverging ends of said legs being secured to said body and the other ends being secured to the rear end of said outer telescoping tubular member to brace the same, a ground engaging wheel carrying member telescoping within said tubular member, a steering mechanism carrying member telescoping within said ground engaging wheel carrying member, and means for independently retracting and extending said last mentioned members.

12. A flying machine having a body and laterally extending wings, concentric telescoping tubular members projecting rearwardly of said body, a tripod member having diverging legs, the diverging ends of said legs being secured to said body and the other end being secured to the rear end of said outer telescoping tubular member to brace the same, a member telescoping within said tubular member and carrying the tail and rear support for the machine, and means for retracting and extending said last mentioned member.

HERBERT LUTHER ADAMS.